July 22, 1958 I. L. AUERBACH 2,844,812

VARIABLE MATRIX FOR PERFORMING ARITHMETIC AND LOGICAL FUNCTIONS

Filed Dec. 4, 1952 3 Sheets-Sheet 1

INVENTOR
ISAAC L. AUERBACH
BY
Lawrence R. Brown
ATTORNEY

FIG. 4
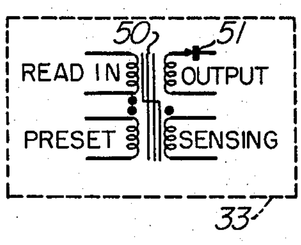
| A | B | S | C |
|---|---|---|---|
| 0 | 0 | 0 | 0 |
| 0 | 1 | 1 | 0 |
| 1 | 0 | 1 | 0 |
| 1 | 1 | 0 | 1 |
$S \Leftrightarrow (A \vee B) \cdot (A \cdot B)'$
$\equiv [(A \vee B)' \vee (A \cdot B)]'$
$C \Leftrightarrow A \cdot B$
FIG. 5
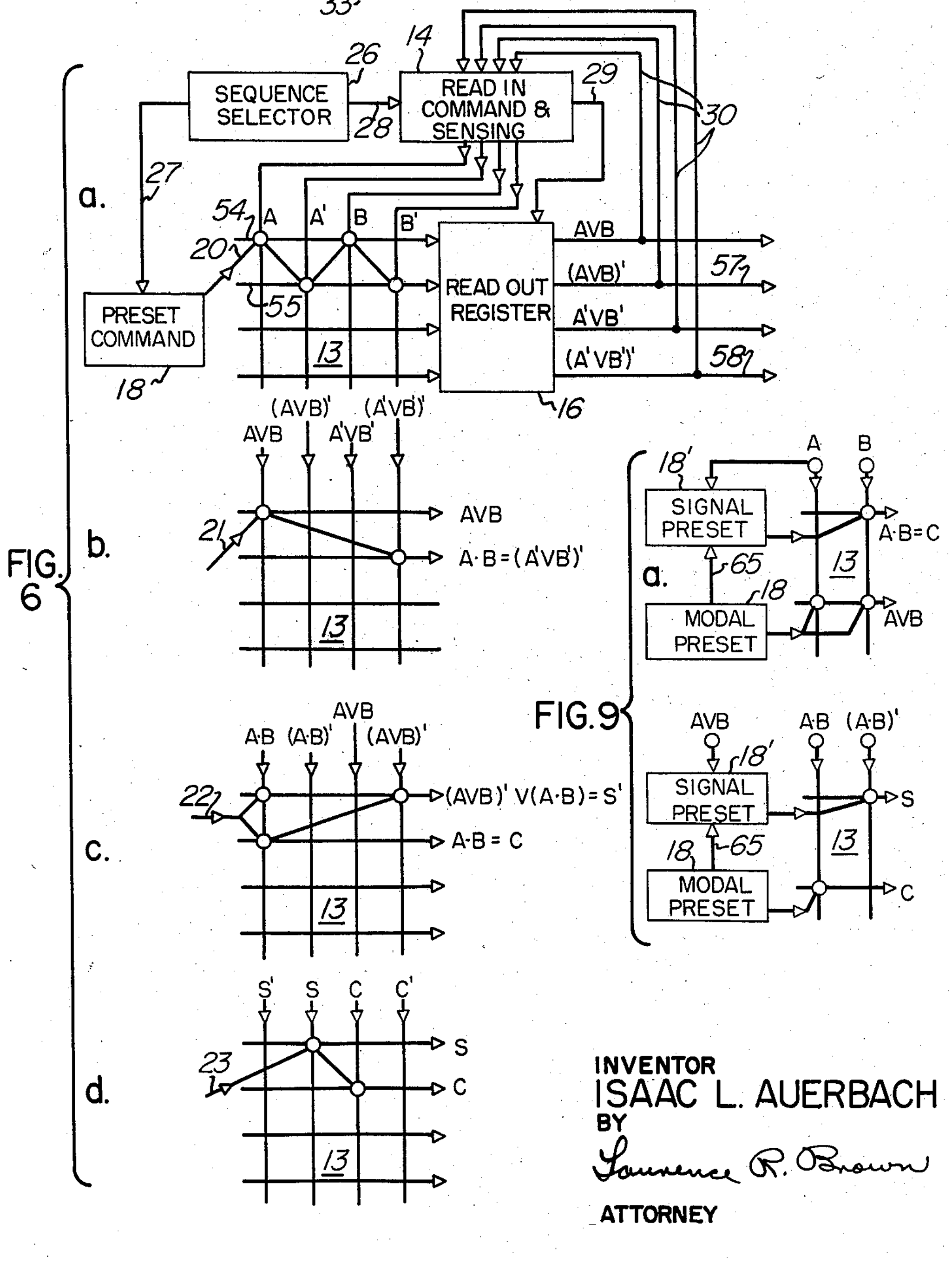
FIG. 6, FIG. 9
INVENTOR
ISAAC L. AUERBACH
BY
Lawrence R. Brown
ATTORNEY INVENTOR
ISAAC L. AUERBACH
BY
Laurence R. Brown
ATTORNEY 2,844,812
Patented July 22, 1958

2,844,812

VARIABLE MATRIX FOR PERFORMING ARITHMETIC AND LOGICAL FUNCTIONS

Isaac Levin Auerbach, Philadelphia, Pa., assignor to Burroughs Corporation, Detroit, Mich., a corporation of Michigan Application December 4, 1952, Serial No. 324,114
23 Claims. (Cl. 340—174)

This invention relates to electronic impedance networks and more particularly it relates to a network of variable impedance elements connected in a plurality of intermeshed signal translation paths in a matrix type gating circuit.

Various circuit techniques have been developed in the electronic computer art for utilizing a matrix type gating network to perform different operational functions such as code conversion, multiplication, and logical functions. Prior art matrix networks generally utilize crystal diodes or resistors as the impedance elements. A given matrix network has, in the past, been utilized to perform only a single operation upon an electrical signal or group of signals. Accordingly, a multi-purpose computer needed several different matrices, each designed to perform a different operational step.

The provision of a single variable purpose matrix type network which may be used to perform a variety of functions in a multiple operation circuit of the type common in electronic computers would greatly simplify otherwise complex circuitry. A satisfactory variable purpose matrix should be capable of a sequential series of diversified operations, which together are capable of providing a completed result signal, and also be capable of a plurality of independent operations. In this manner, a general purpose computer might be constructed with a single matrix network to individually perform addition, multiplication, or like steps, as well as more complex functions derived by programming combinations of substeps. There is, therefore, a need for a single matrix type gating network in which a plurality of different functional operation steps can be performed in sequence without rewiring the matrix elements.

In accordance with the present invention, therefore, there is provided a plurality of variable impedance elements connected in a network of intermeshed signal translation paths together with means for presetting the impedance elements in a state which causes the signal to be functionally modified upon transmission through the network. In one preferred embodiment of the invention the impedance elements are static magnetic transformers of the type described by An Wang in his article entitled "Magnetic triggers" published in the June 1950 issue of the Proceedings of the I. R. E.

These transformers have cores of a magnetic material with a substantially rectangular hysteresis characteristic which can be caused to remain in a magnetic remanence condition. The remanence condition may be established by a polarized saturating magnetizing force. The residual magnetic flux can be in either of two directions, which may be arbitrarily labelled "1" and "0" to designate the corresponding binary conditions which may be considered stored by the element. A polarized sensing or read-out signal may be induced in a winding upon the core at any time, thereby affording a delay time for as long as may be required. If the polarity of the remanence condition corresponds to that of the read-out signal, low impedance is presented by the winding on the core and relatively little output voltage is developed. Conversely, a high output signal voltage is induced when a read-out signal of opposite polarity is applied. Such a signal switches the state of remanence from one polarity to another. Accordingly, a static storage condition is established which may be interpreted at will by suitable sensing pulses.

These static magnetic elements are utilized in the present invention as variable impedance elements in a matrix type network Such elements are readily preset in one remanence condition, by a presetting pulse of one polarity, to serve as a gate for signal pulses of an opposite polarity applied thereafter to change the condition of remanence and thereby excite an output pulse. By selecting a plurality of different interconnected preset paths in a matrix type network, the signals passing through the network are subjected to a different functional operation for each different preset condition. Accordingly, the present invention provides a variable matrix type gating network comprising a plurality of variable impedance elements which are preset in accordance with desired operational functions.

It is, therefore, a general object of the invention to provide improved and simplified electronic circuits.

It is another object of the invention to provide variable purpose impedance networks, which may be utilized in computer circuits.

A further object of the invention is to provide a system capable of different successive functional operations with a single impedance network.

A further object of the invention is to provide means and methods for utilizing a matrix type gating network to perform diverse operational steps upon electrical signals.

Other objects and features of advantage of the invention will be found throughout the following detailed description of the invention. Those novel features believed descriptive of the nature of the invention are defined with particularity in the appended claims. For a clear understanding of the invention, its construction, and its mode of operation, the description may be considered in connection with the accompanying drawings, in which:

Figs. 2 to 4 are diagrams of impedance elements of the type which may be used in the variable matrix network provided in accordance with the principles of the present invention;

Fig. 5 is a truth table illustrating the addition process of two binary electronic input signals;

Figure 7:
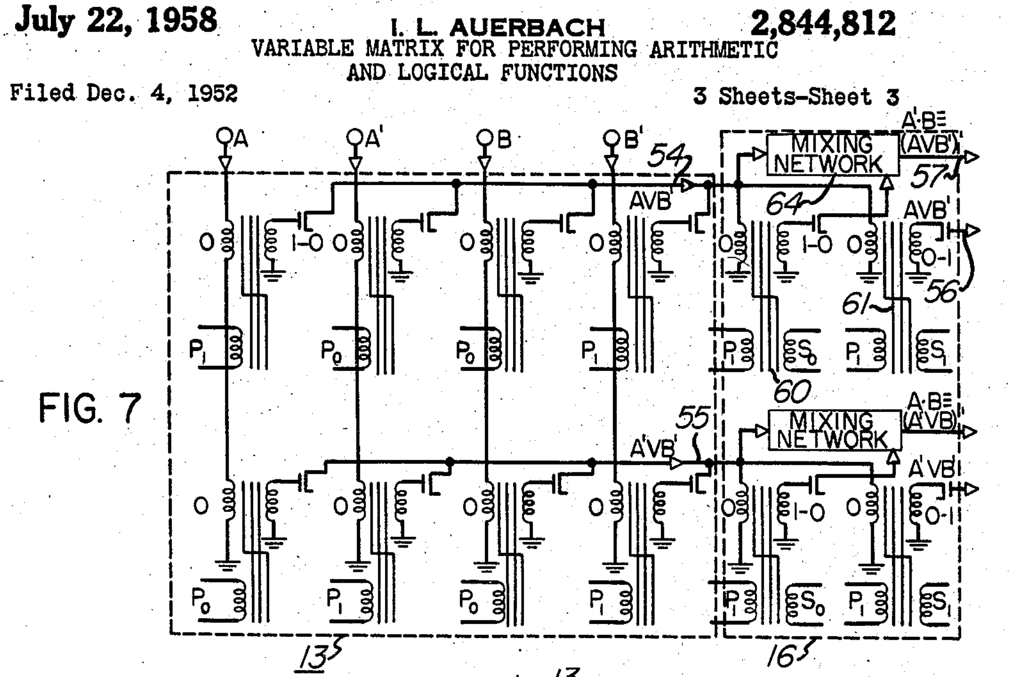
Figure 8:
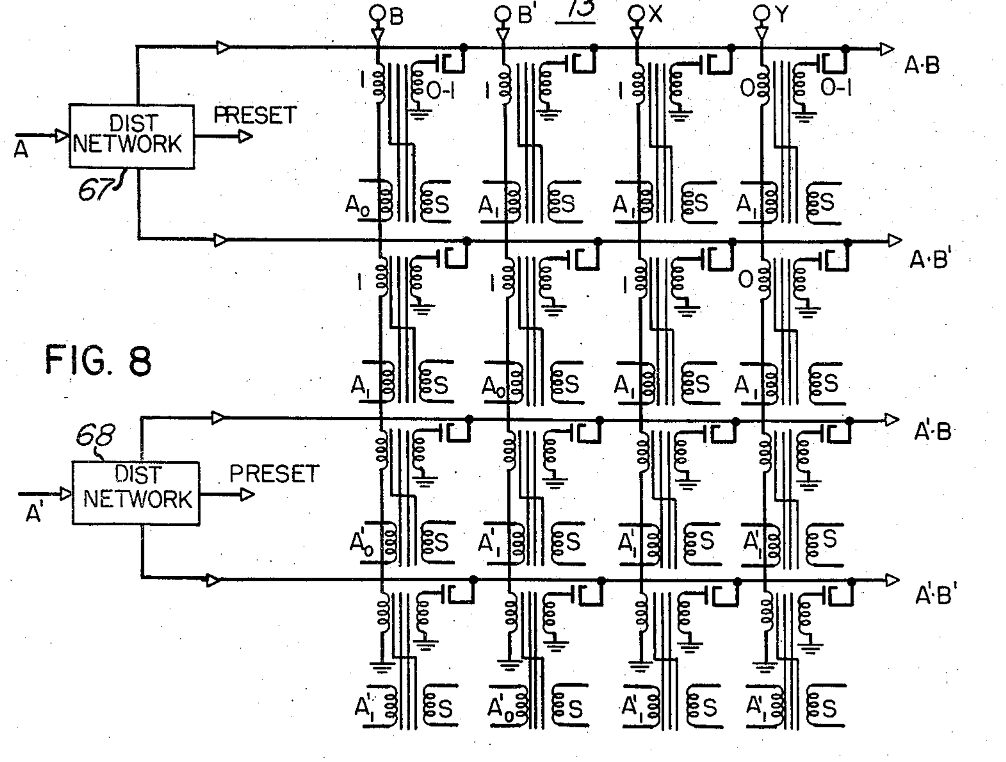

Figs. 6*a* through 6*d* are circuits diagrams of a variable matrix circuit constructed in accordance with the invention as utilized to perform a series of different functional steps of operation leading to a complete logical result;

Figs. 7 and 8 are schematic circuit diagrams of matrix type networks embodying the invention; and Figs. 9*a* and 9*b* are schematic circuit diagrams showing a modification of the invention for performing a series of operational steps.

Throughout the respective views, like reference characters will be used to designate similar circuit components to facilitate comparison. To more clearly indicate the nature of the present invention those circuits whose details are not in themselves a part of the present invention, and which may readily be selected by those skilled in the art to suit the needs of any electronic circuit in which the invention is used, are shown in block diagram form.

Figure 1:
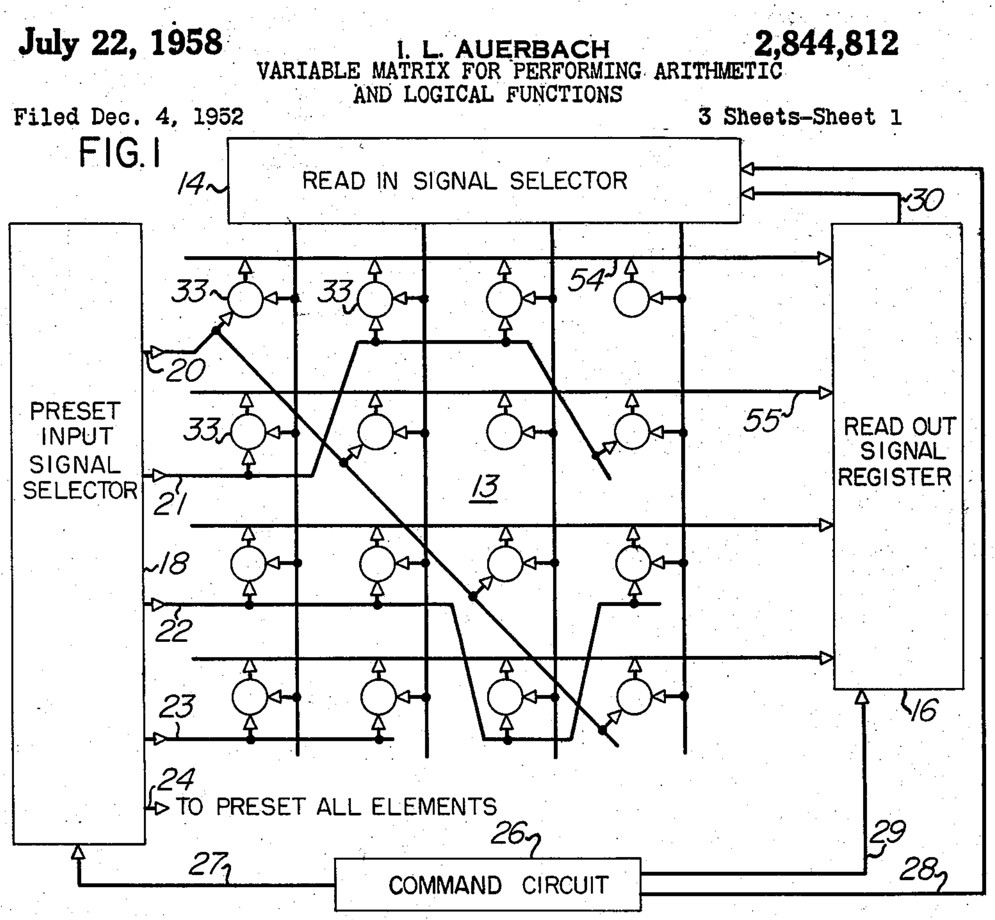
Fig. 1 is a combined block and schematic diagram of a computer type circuit utilizing a variable matrix network in accordance with the present invention.

Referring now in particular to Fig. 1, a matrix network 13 is provided in which a plurality of variable impedance elements 33 are indicated schematically by circles. Read-in signals are presented to individual impedance elements in the matrix rows from one of a series of matrix columns connected to the signal selector circuit 14. It may be assumed that the read-in signals excite output signals from certain selected impedance elements to pass out along the series of matrix rows 54, 55 etc. into the register 16. To determine which impedance elements will be actuated by read-in signals, a preset input signal selector circuit 18 operates to preset different combinations of impedance elements in a given polarity indicated by the arbitrarily selected preset circuits established by leads 20 to 24. It may be assumed that these leads indicate certain elements to be set in one polarity while the remaining elements are simultaneously set in the opposite polarity. For purpose of simplicity only those cores set at one polarity are shown.

Consider the network to be used in an electronic computer providing commands from the circuit 26. In accordance with one mode of operation, the command circuit actuates the preset selector 18 by way of lead 27 to cause a suitable matrix function to be selected. For example, the command given to the preset signal selector might be of the nature of the complete operations add, subtract, multiply or divide or of logical sub-steps such as code conversion, gating, "logical and" or "logical or" functions. The command circuit 26 also actuates the read-in selector circuit 14 by way of lead 28. Thus, one or more suitable electronic signals may be inserted along the columns to pass through different translation paths designated by the preset circuit, thereby arriving by way of designated rows at the register 16 in modified or re-arranged form. The particular matrix network organization and preset pattern may be chosen by those skilled in the art to perform desired functional operations upon the signal. Thus, the entire computing operation may be performed by a single traversal of the signal through the matrix network, or, in the interest of circuit economy, a less complex network may be used to perform the computing operation in a series of steps.

In some instances, therefore, it is desirable to perform a series of operations upon the signal by successively passing it through the same matrix network. Accordingly, the computer command circuit by way of lead 29 actuates the register 16 to cause the stored signal to again be inserted in the matrix network by way of lead 30 and the read-in selector circuit 14. In this way a single simple matrix network may be utilized for performing a multiplicity of different operations upon an electronic signal.

Impedance elements of the matrix network designated by the reference character 33 may be considered as gating circuits and in some instances also as storage circuits. Thus, a preset signal into the impedance element will condition it so that a later read-in signal into the element will cause a read-out or gated signal. If the preset signal is held for a time increment before read-in, storage is effected.

Figure 2:
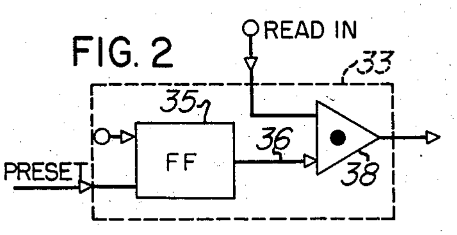

The variable impedance element may be of several different configurations as will now be described in connection with Figs. 2, 3 and 4. First considering the block diagram of Fig. 2, a flip flop circuit 35 may be actuated by a preset input signal to establish an output signal at lead 36. A coincidence or logical "and" circuit 38 is connected to receive the flip flop excitation at one input terminal and a read-in signal at a further input terminal. An output pulse is therefore provided by the "and" circuit 38 in response to a read-in signal only when the preset pulse has placed the flip flop circuit in a condition that establishes a signal at its output lead 36. It may now readily be seen that any device operating in this general manner may be utilized in the variable gating network as an impedance element.

Figure 3:
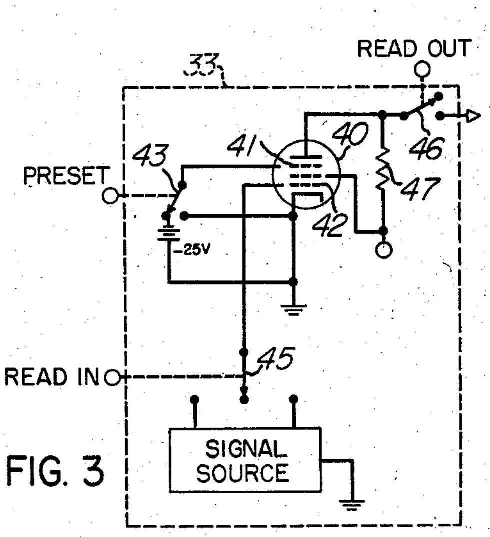

In Fig. 3 an electronic tube impedance element 33 is shown wherein two different control electrodes 41 and 42 may be used respectively for presetting and reading-in a signal. It is readily seen that by actuating the preset switch 43, the suppressor grid 41 may be conditioned to allow conduction in the tube 40 when control grid 42 is actuated. Therefore, the read-in switch 45 may be used to select a signal causing a corresponding output signal to be developed at the plate resistor 47. Read-out is therefore automatically excited by the input signal when the read-out switch 46, if desired. Selective read-out is afforded by means of the switch 46, if desired.

Because electronic tubes utilize standby power it is generally preferable to use a static magnetic element of the type aforementioned as the impedance device 33. Such an element is schematically illustrated in Fig. 4, wherein the core 50 designates a magnetic material having a substantially rectangular hysteresis characteristic and a propensity to remain in a state of residual magnetization whose direction depends upon the polarity of the previous input signal. It is assumed that the input signal currents to such an element are all of an amplitude sufficient to saturate the core 50. When a preset signal is applied to the preset winding, a remanence of one polarity is provided. The read-in pulse is applied in a polarity opposite to that of the preset signal and will cause an output signal only if the preset signal has previously occurred. A delay in time may exist between the preset signal and the read-in signal if so desired. The rectifier 51 is provided to permit an output signal only when the core switches from one condition to the other, say from "1" to "0," and to inhibit an output signal when the core switches in the opposite direction.

As hereinbefore explained an output pulse is generated by the read-in pulse only when the polarity of remanence in the core is changed in an arbitrarily selected direction. However, to provide a selective read-out function similar to that of the read-out switch 46 of Fig. 3, a sensing winding may be provided. The sensing winding would provide the same polarity pulse as the preset winding in order to read-out a signal that has been read-in. It is noted that in this type of operation storage also may be performed by the static magnetic elements and therefore the matrix network operates both as a register and operational circuit. This principle of operation is described in the copending I. L. Auerbach and R. W. Avery application entitled "Logical Computer Circuits," Serial No. 324,116, filed December 4, 1952, and assigned to the same assignee.

If the complement or "logical not" function of the signal, which shall be designated by primed signal reference characters, is desired, the sensing may be made in the same polarity as the read-in signal so that an output signal is provided only in case there is not a read-in signal. This operational technique is fully described in the copending application of R. W. Avery for "Logical Circuits," Serial No. 324,118, assigned to the same assignee as this application and filed December 4, 1952.

Keeping in mind the general operation of the matrix network hereinbefore described, one possible series of functional steps in providing the addition of two binary input signals A and B may be considered. The truth table of Fig. 5 illustrates the necessary conditions for a sum (S) and carry (C) signal which is a function of the two input signals A and B. The presence of signal A is designated by the condition "1" and the absence of signal A is indicated by the condition "0," which is the complement of signal A designated by the signal notation A′. Thus, a carry signal C is desired if and only if both A and B are present. Likewise, the sum signal S is desired if and only if either signal A or B is present and not both signals A and B. This may also be stated: if there is not either the conjunctive condition of both signals A and B or the alternative condition not the presence of either signal A or B, the sum is present.

A matrix system is shown in Fig. 6*a* for performing the necessary logical steps to establish a sum and carry signal from input signals A and B in accordance with the truth functions discussed. The preset command circuit is connected for establishing a first operational step. Figs. 6*b* through 6*d* show further preset connections for successive sequential steps taken to provide the resulting sum and carry output signals. It is to be recognized that the operation illustrated is used for purposes of clearly indicating the nature of the invention and its mode of operation, but that those skilled in the art may in view of the present teachings, select different types of matrix configurations, modes of operation, and programming techniques to obtain desired results without departing from the spirit or scope of the invention.

The command circuits of Figs. 6*a* are substantially identical to those designated in Fig. 1, as indicated by corresponding reference characters. The read-in command circuit 14 provides the desired signals A and B together with the complements A′ and B′ along the four columns of the matrix network. The preset command circuit 18 primes the impedance elements along a first preset chain 20 at those intermeshing circuit positions indicated by the small circles. Accordingly, output signals may be gated along the rows 54 and 55 to designate the respective functions A or B and A′ or B′. The read-out register circuit 16 is utilized to store the functions until a read-out command appears on lead 29 at which time the signal complements are also presented to the output leads 57 and 58. Actuation of the read-out register by a signal, on lead 29, from the read-in command circuit, re-presents the information into the columns of the matrix by way of leads 30 and the read-in command circuit 14. This occurs when such operation is designated for circuit 14 by way of lead 28 from sequence selector 26. To establish a condition such as is shown in the matrix of Fig. 6*b*, a further preset command 21 is chosen by the sequence selector 26 and is transmitted by way of lead 27. In the same manner further steps of Figs. 6*c* and 6*d* result in the ultimate output signals S and C satisfying the logical requirements designated in Fig. 5.

From the description of this operation it is readily seen that a simple matrix network may be sequentially preset in accordance with the present invention to perform different types of logical steps in a simplified multi-purpose electronic circuit. Such a circuit is highly desirable for universal computer circuit application and other suitable electronic operations.

It was assumed in the circuit of Fig. 6*a* that complementary signal functions were provided by the read-out register circuit 16. A more detailed representation of such means as accomplished by static magnetic elements is schematically shown in Fig. 7 together with a matrix type network connected to provide logical operation. The notation used to designate signal conditions in the static magnetic elements indicates a signal establishing a remanence polarity of either "1" or "0" at the preset winding and an input signal establishing a remanence polarity of "0" at the input windings. The output rectifiers are poled to provide an output signal when the state of static element is changed from"1" to "0." Thus, an output signal is presented to the first row 54 only if a signal A or a signal B′ (or both) is present to change the preset condition of "1" to the remanence condition "0" and pass an output potential pulse through the rectifier. Likewise in row 55 similar operation provides an output if either a signal A′ or B′ (or both) is present.

For each row 54 and 55 there is provided in the read-out register circuit 16 two static magnetic consolidating elements such as 60 and 61 in row 54, which respectively provide at output leads 56 and 57 the signal A or B′ and its complement or logical "not" function.

As the signal is excited in row 54, a remanence condition of "0" is established in both elements 60 and 61. This overcomes a preset condition of "1." Because of the rectifier polarities, an output pulse would be provided during this time by element 60. Such may be undesirable in a system not responsive to signals at a particular time, and therefore a mixing or inhibiting network 64 may be provided for causing the output signal at lead 54 to cancel this undesired output pulse afforded by the element 60. Because the rectifier of element 61 is connected in an opposite direction to pass only changes from "0" to "1," this pulse is inhibited and no mixing network is necessary.

Thus far the signal is stored in each of the elements 60 and 61 which operate as a register. The signals are available for read-out in accordance with suitable sensing pulses $S_0$ and $S_1$ applied to sensing windings of the respective elements 60 and 61. Since the signal storage condition is in the state "0" when a signal was previously presented, the sensing pulse $S_0$ will not excite an output pulse from element 60 unless there was "not" a read-in pulse along the row 54. Therefore, element 60 acts as a logical "not" element to provide the complement of the input signal from lead 54 at output lead 57. Element 61, however, with a sensing polarity $S_1$ provides an output signal in the output lead 56 when an input signal was presented. It is clear from the foregoing description of the networks described that either the logical "and," "not" and "or" gating functions may readily be accomplished. In this manner the invention may be adapted for use in any desirable logical circuit design.

In the hereinbefore described operational sequence of Fig. 6, it is noted that the matrix network was used as a logical "or" circuit and the logical "and" function was derived by converting the "and" expression into an "or" expression. Operation of the circuit to directly perform an "and" function, however, would tend to simplify the operational procedure necessary. In order to effect such operation, a network comprising static magnetic elements, such as schematically shown in Fig. 8, may be utilized. In essence, the static magnetic elements in this embodiment are used as primed gate circuits of the type more fully described in the copending application of I. L. Auerbach and J. O. Paivinen, Serial No. 324,115, entitled "Switching Circuits and Methods" assigned to the same assignee as this application and filed December 4, 1952. Thus, one signal may be used to preset a core or prime it so that a further signal will only be gated in the presence of the initial signal.

In accordance with this aspect of the invention, one of the signals, A, is utilized to preset the impedance elements. Since an output signal is provided along the rows in response to signal B only when the impedance element along the B column and in one of the rows is properly preset, an output signal is provided only when both signals are present in conjunction. Therefore the logical "and" condition is satisfied. By utilizing the complements of the signals A and B in different matrix rows and columns, any combination of the A and B functions may be derived with a two by four matrix array.

Signals A and B should be sequentially presented to permit preset by A prior to read-out by B. If it is desired to simultaneously present signals A and B for obtaining "and" operation, each signal may be applied to the same winding with an amplitude half that needed to switch the magnetic element, thereby necessitating both signals A and B in coincidence to provide read-out.

Input signals X and Y, as shown in Fig. 8 along columns unused by signals A or B, need not be disconnected from a matrix network of this type when the proper preset polarities are afforded. Thus, note in column X the signal tends to establish remanent condition "1" which is the same as the present condition of "1" and therefore no output pulse is afforded. In column Y however, even an input signal establishing the condition "0" is ineffective in exciting an output signal because of the polarity of the output rectifier which conducts only a signal established when the remanence polarity is changed from "0" to "1."

It is noted that the distribution networks 67 and 68 are provided for conveying the respective signals A and A′ to different rows of the matrix. This network serves the same functions as the mixing network 64 of Fig. 7. Since a preset pulse, which changes a remanence condition "0" to the remanence condition "1," will excite an output pulse along the respective rows, the input signal may be inserted at the rows by the distribution network to cancel the output pulse afforded at this time, if desired.

To effect storage and "not" functions in the matrix network, the sensing coils may be utilized with suitable signal polarities to establish an output signal in response to a sensing pulse rather than read-in pulses.

Again consider the addition operation represented by the truth table of Fig. 5. Figs. *9a* and *9b* illustrate a two step addition operation possible when the logical "and" function is attained by establishing preset in accordance with one signal condition. In this circuit it is noted that there are two preset circuits designated by the blocks 18 and 18'. The preset circuit 18 operates substantially as hereinbefore described to establish the mode of operation. Designation of the logical step to be performed is accomplished by switching a desired preset combination of elements into effect. In this respect the lead 65 also designates the mode of operation to be established by the signal preset section 18'. Thus, in Fig. *9a* the signal A presets the element located at the junction of the first row and the B column. The output condition A and B therefore is directly produced which is the desired result C. In the second row, however, the gating "or" function is provided where an output is excited in the second row by either an input signal A or B as a result of presetting the element in both columns A and B only in accordance with the operational mode and independently of any input signal.

The two output signals, AVB and A·B are presented to the same matrix gating circuit in a successive sequential step. The matrix of Fig. *9b* is thus preset for a slightly different mode of operation than that of Fig. *9a* to modify the signal in accordance with a different logic. Accordingly, output signals S and C similar to those derived hereinbefore in four operational steps are provided in two operational steps. It is, therefore, seen that in accordance with this phase of the invention the variable matrix may be utilized more efficiently.

There is, therefore, provided by the present invention an improved electronic impedance network for selectively producing a variety of operational steps upon an input electronic signal. A multi-step operational system may be provided, in accordance with one aspect of the invention, utilizing the variable impedance network to sequentially perform different operational steps. Electronic computer circuits, and the like, are thereby greatly simplified in view of the means and methods of operation of the present invention.

Having therefore described the invention, its construction and mode of operation, the features of novelty for which Letters Patent are desired are described with particularity in the appended claims.

What is claimed is:

1. An electronic system comprising a network of variable impedance elements connected in a plurality of intermeshed input-output signal paths of different geometric configuration, means for variably selecting one of said input-output signal paths through said network, and means for selectively presetting different impedance elements in the selected input-output signal path in a desired impedance state, wherein the means for variably selecting a desired input-output signal path comprises a multiple-step operation electronic circuit for modifying some successive operational steps from the preceding operational steps, means for selecting an input-output path for each operational step, and means for actuating the presetting means with said multiple-step circuit to define the operations to be performed in the signal path during the respective steps.

2. The method of signal translation in a network of variable impedance elements connected in a plurality of intermeshed signal translation paths comprising the steps of selectively passing a signal through successive input-output signal paths in said network, and presetting different elements in said input-output paths for different signal traversals to thereby perform different functional operations upon the signal.

3. The method of operating a network of variable impedance elements connected in a plurality of intermeshed signal translation paths for performing a variety of operational functions comprising the steps of passing signals through said network during different operational steps, and selectively changing the characteristics of elements in the network to define different effects upon the signals during the different steps of operation.

4. A network of static magnetic elements connected in a matrix type network, each of said elements being capable of assuming either of two stable magnetic remanence conditions, a circuit for selectively presetting different combinations of the elements in one remanence condition, and means for passing signals through the matrix as different preset combinations are in effect to thereby cause different functional operation steps to be performed on the signals.

5. An electronic circuit comprising, a plurality of input storage elements connected in a network having columns and rows with the elements each being associated with one column and one row, output means connected to said rows, presetting means to establish a predetermined storage condition in each element, command means actuating said columns with input signals for changing the storage conditions of elements connected thereto which are preset in one storage condition, and sensing means for applying signal energy to said rows responsive to actuation of those elements in said columns in a given storage condition to thereby transfer signal indications to said output means.

6. A circuit as defined in claim 5 wherein said presetting means is adapted for establishing a given storage condition in selectively variable combinations of input elements for different functional operation steps.

7. An electronic circuit comprising a plurality of static magnetic storage elements, each of said elements being capable of assuming either of two polarities of stable magnetic remanence, input windings on each of said elements, circuit means connecting said input windings in a plurality of circuits comprising columns of a coordinate array, output windings on each element, unidirectional devices serially connected with each output winding, circuit means connecting said unidirectional devices to a plurality of buses comprising rows of said coordinate array, presetting means for establishing a predetermined magnetic remanence polarity in each of said elements, and sensing means for reading out the remanence condition of the elements as a signal along said buses.

8. An electronic circuit comprising, a network of bistable static magnetic elements connected in a plurality of intermeshed signal paths, means for variably selecting a desired input-output signal path through said network, means for selectively presetting the elements in said input-output path in one of the stable states, and consolidating elements connected for performing the logical "not" signal condition responsive to signals in said input-output signal path.

9. An electronic system comprising a network of static magnetic elements connected in a network of rows and columns, each of said elements being capable of assuming either of two stable states of magnetic remanence, a circuit defining an input-output signal coupling path through a plurality of said elements in a geometric pattern encompassing selected portions of different rows and columns, means for reading input signals selectively into at least one of said columns, in response to a logical signal combination, and means coupled to at least one of said rows for utilizing output signals coupled from said columns by said signal coupling path.

10. An electronic system comprising a network of static magnetic elements connected in a matrix network, each of said elements being capable of assuming either of two stable states of magnetic remanence, and a circuit defining an input-output signal coupling path with a portion of said elements connected together in a geometric pattern encompassing all of said rows and columns.

11. An electronic system comprising a network of static magnetic elements connected in a network of rows and columns, each of said elements being capable of assuming either of two stable states of magnetic remanence, a circuit defining an input-output signal coupling path connected together in a predetermined pattern encompassing only a portion of the elements in any one row or column.

12. A system as defined in claim 11 wherein output means is provided to read information simultaneously out of all the elements connected along said input-output coupling path.

13. A system as defined in claim 12 wherein means is provided for sequentially reading signals out of the network from different groups of elements.

14. An electronic circuit comprising a plurality of variable impedance gating elements connected in a network of rows and columns, means for selectively presetting a plurality of different configurations of said elements in one gating impedance state, means for reading signals into said network, and means for reading signals out of said network only in response to one gating condition, said preset elements being the sole coupling means for transmitting signals between the read-in and read-out means, whereby the network may be selectively utilized for different sequential operations on a read-in signal.

15. An electronic circuit comprising a plurality of two impedance gating elements connected in a network of rows and columns, means for presetting a plurality of said elements arranged in a geometric pattern encompassing selected portions of different rows and columns in one gating impedance state, means for reading signals into said network, and means for reading signals out of said network only as a function of the said one gating impedance state of the preset elements.

16. A circuit as defined in claim 15 wherein the impedance elements are static magnetic transformers each capable of assuming either of two polarities of stable magnetic remanence, and the presetting means establishes one magnetic remanence polarity in said portion of elements.

17. An electronic system comprising a network of bistable variable impedance elements having one set of signal conductors connected to a plurality of the elements in a plurality of intermeshed input-output signal paths of different geometric configuration, means for variably selecting one of said input-output signal paths through said network, means for selectively presetting different impedance elements in the selected input-output signal path in a desired impedance state, and readout means coupled to scan all the impedance elements but responsive to produce output signals only from the preset impedance elements as a function of the said preset impedance state.

18. An electronic circuit comprising in combination, a network of bistable state impedance elements connected in a plurality of intermeshed signal translation paths defining the rows and columns of a matrix array, means for selectively coupling different combinations of elements in said network to establish one of the stable states, said combinations being chosen to perform a series of related functional operations, and means for successively passing a signal through the different combinations to perform cumulative logical operations.

19. An electronic circuit comprising in combination, a network of bistable variable impedance elements connected in a plurality of intermeshed signal translation paths of different geometric configuration, means for reading in a first signal by presetting to one state the impedance of said elements in one of the translation paths in said network, and means reading in a second signal by selectively passing it through a signal translation path encompassing all the elements in said network to tend to set said elements in the other state to produce an output signal as a function of the impedance state of the preset elements.

20. A circuit as defined in claim 19 wherein the impedance elements comprise static magnetic elements with a substantially rectangular hysteresis characteristic and having a tendency to remain in one of two permanent magnetic remanence states.

21. An electronic circuit comprising, a plurality of input storage elements connected in a network of rows and columns, means including a common circuit extending to a sub-group of said elements in a geometrical pattern for reading a first electronic signal into the network by presetting the elements of said pattern to one predetermined stable storage condition, means for reading a second group of signals into said columns to tend to switch all the elements to the other stable condition responsive to a change of state of said elements, and means for reading signals out of said rows.

22. An electronic circuit comprising a plurality of static magnetic elements each capable of assuming either of two polarities of stable magnetic remanence, said elements being connected in a network of rows and columns with one winding on each element connected only to said columns and another winding in each element connected only to said rows, means for reading signals in said columns, means for reading signals out of said rows in response to the read-in signals, a further winding on each element for presetting an initial storage condition, and means including a plurality of common connections of a plurality of the further windings of elements arranged in different geometric patterns for selectively presetting different combinations of elements in one storage polarity.

23. Variably actuable storage apparatus comprising a plurality of input bistable state storage elements connected in a network of rows and columns, a plurality of command means each coupled to all the elements for reading one predetermined state of storage conditions into part of the elements arranged in a unique geometric pattern for each command means and for reading the other predetermined state into the rest of the elements of said network, and means for tending to selectively change the state of all elements in a sensing pattern different from said geometric pattern to thereby cause those elements common to the geometric and sensing patterns residing in said one predetermined state to change said other predetermined state read out signals representative of information stored in one of the different unique combinations of said storage elements.

References Cited in the file of this patent

UNITED STATES PATENTS

| | | |
|---|---|---|
| 2,590,950 | Eckert | Apr. 1, 1952 |
| 2,609,143 | Stibitz | Sept. 2, 1952 |
| 2,657,272 | Dimond | Oct. 27, 1953 |
| 2,719,965 | Person | Oct. 4, 1955 |

OTHER REFERENCES

Publication III: "Magnetic Binaries in the Logical Design of Information Handling Machine" (Saunders), Association for Computing Machinery, Proceedings, May 1952, pages 223–229. (Copy in Scientific Library (16).)

Publication I: Proceed. of Assoc. for Comp. Machinery, Sept. 1952, pp. 6–12.

Publication II: RCA Review, vol. 13, Issue 2, June 1952, pp. 183–201.

Haynes, M. K.: Thesis entitled "Magnetic cores as elements of digital computing systems." On file: University of Illinois Library, Dec. 28, 1950, Patent Office Library, May 12, 1952, pp. 33–35, 46–50, 57–58. (Copy in Div. 23.)

Progress Report (2) on the Edvac, Moore School, University of Pennsylvania, June 30, 1946, pages Py-o-164 (4–22) to (4–24). (Copy in Div. 42.)